(12) United States Patent
Bauer et al.

(10) Patent No.: US 8,166,051 B1
(45) Date of Patent: Apr. 24, 2012

(54) COMPUTATION OF TERM DOMINANCE IN TEXT DOCUMENTS

(75) Inventors: Travis L. Bauer, Albuquerque, NM (US); Zachary O. Benz, Albuquerque, NM (US); Stephen J. Verzi, Albuquerque, NM (US)

(73) Assignee: Sandia Corporation, Albuquerque, NM (US)

(*) Notice: Subject to any disclaimer, the term of this patent is extended or adjusted under 35 U.S.C. 154(b) by 496 days.

(21) Appl. No.: 12/364,753

(22) Filed: Feb. 3, 2009

(51) Int. Cl.
*G06F 17/30* (2006.01)
*G06F 17/00* (2006.01)

(52) U.S. Cl. ........................................ 707/750; 707/749

(58) Field of Classification Search .................. 707/749, 707/705, 736, 748; 706/12–14, 45–61
See application file for complete search history.

(56) References Cited

U.S. PATENT DOCUMENTS

| | | | |
|---|---|---|---|
| 5,442,778 A * | 8/1995 | Pedersen et al. | 1/1 |
| 6,137,911 A * | 10/2000 | Zhilyaev | 382/225 |
| 6,477,524 B1 | 11/2002 | Taskiran et al. | |
| 6,611,825 B1 | 8/2003 | Billheimer | |
| 6,701,305 B1 | 3/2004 | Holt et al. | |
| 7,440,947 B2 | 10/2008 | Adcock et al. | |
| 7,451,124 B2 | 11/2008 | Handley | |
| 2009/0157656 A1 * | 6/2009 | Chen et al. | 707/5 |

OTHER PUBLICATIONS

Salton, Gerard and Buckley, Chris "Term Weighting Approaches in Automatic Text Retrieval", Information Processing & Management, vol. 24, Issue 5 (1988), pp. 513-523.*
Bauer, Travis Ladell, et al, "Surprise Detection in Document Corpora", SAND2008-4366, Printed Jul. 2008.
Dumais, Susan T., "Improving the Retrieval of Information from External Sources", Behavior Research Methods, Instruments, & Computers 1991, 23 (2), 229-236.
Chisholm, Erica, et al, "New Term Weighting Formulas for the Vector Space Method in Information Retrieval", ORNL/TM-13756, Mar. 1999.

* cited by examiner

*Primary Examiner* — Tony Mahmoudi
*Assistant Examiner* — Keith Yuen
(74) *Attorney, Agent, or Firm* — Robert D. Watson (57) ABSTRACT

An improved entropy-based term dominance metric useful for characterizing a corpus of text documents, and is useful for comparing the term dominance metrics of a first corpus of documents to a second corpus having a different number of documents.

23 Claims, 8 Drawing Sheets

COMPUTATION OF TERM DOMINANCE IN TEXT DOCUMENTS

FEDERALLY SPONSORED RESEARCH

The United States Government has rights in this invention pursuant to Department of Energy Contract No. DE-AC04-94AL85000 with Sandia Corporation.

CROSS-REFERENCE TO RELATED APPLICATIONS

None

BACKGROUND OF THE INVENTION

The present invention relates generally to the areas of computerized methods of information extraction from text documents and databases, statistical text analysis, keyword searching, and internet/web searching.

Developing technology capable of meeting individual information needs is challenging because the full context of a person's expertise is hard to summarize in the query presented to the system. There are several factors beyond the volume and type of information encountered in the past that contribute to a person's expertise. One is how well they digested and understood the information. Another factor is what was driving their interest in digesting the information in the first place. If different people encounter the same information with different motivations, they may acquire different types of expertise.

Current methods employed for helping people meet their individual information needs sometimes uses tools based on cognitive psychology to understand how a person interacts with data and how reading that information affects their behavior during information search.

One common way to help people find surprising information on the World Wide Web is the search engine, of which Google™ is one of the most popular examples. To use a search engine, the person conveys directly to the computer system their information need via a keyword query and the computer retrieves documents that contain those terms. In this case, the computer neither understands the user's needs nor detects what the user would find surprising. The user is providing the information about what would be relevant and hoping that the search results will also contain the information desired. A skilled search engine user can use a combination of keywords that both convey the general area of interest and the subset of documents in that area that is likely to include the desired information.

In contrast to a monolithic search engine like Google™, the field of personal information retrieval uses additional techniques employed to try to understand what would be of interest to that specific person. Two techniques commonly employed will be mentioned here. The first method (i.e., information retrieval systems) is to generate statistics based on some background corpus of information that matches a person's domain expertise. In this case, a document is considered likely to contain relevant information if its terms meet some criteria related to the statistical composition of the corpus. A second method (also known as collaborative filtering) operates with implicit or explicit feedback from either the user or other users who are deemed to be similar. For example, on Amazon.com, when someone purchases a book, they are presented with a window indicating that other shoppers who purchased the same book also purchased some other specific books. The assumption is that two people who buy the same book are likely to find relevant information in other books that each one of them has read individually.

Against this background, the present invention was developed.

SUMMARY OF THE INVENTION

The present invention relates to an improved entropy-based term dominance metric useful for characterizing a corpus of text documents, and is useful for comparing the term dominance metrics of a first corpus of documents to a second corpus having a different number of documents.

BRIEF DESCRIPTION OF THE DRAWINGS

The accompanying drawings, which are incorporated in and form part of the specification, illustrate various examples of the present invention and, together with the detailed description, serve to explain the principles of the invention.

DETAILED DESCRIPTION OF THE INVENTION

Nomenclature

Domain General Vocabulary
  Terms that have a low entropy in a particular body of literature, but occur at least once.
Domain Specific Vocabulary
  Terms that have a high entropy in a particular body of literature, but a low entropy in the English language as a whole.
Dominance
  How frequent and spread out a term's occurrences are across a corpus. This is a specialized form of the entropy equation that gives high values to terms with high entropy, and is normalized for corpus size.
Entropy
  The "average amount of information per term (e.g., word, phrase, token) over a whole alphabet." In statistical text analysis, it is how "spread out" a term is across a corpus.
Expectation
  A prediction that a particular piece of data is going to occur in some context.
Frequency
  The number of times a term occurs, either in some document or across an entire corpus.

Global Weight
  A value assigned to a term in a corpus describing how well the meaning of that term describes the contents of the corpus. Global weights are often a function of the term's entropy in a corpus with a high value given to terms with a low entropy.
Local Weight
  A value assigned to a term in a specific document reflecting how well that term is likely to describe the document's contents. It is often a function of the frequency of the term's occurrence in the document with a high frequency term being given a high local weight.
Novelty
  How much some item differs from items seen in the past along some dimension.
Salience
  How much some components of a single item (such as pixels in a single image) differ from the other components of that same item along some dimension.
STANLEY
  Sandia Text ANalysis Extensible librarY, a text analysis library developed at Sandia National Labs with the goal of modeling individuals from text that they produce.
Surprise
  A piece of data that violates some previously established expectation.
Target
  A word in a text that a person reads that is monitored with respect to how much time and how often the person fixates on it.
Term Association
  The tendency of two terms to co-occur, as measured by cosines of vectors generated for each term.

A new technical idea we are exploring is to look for potential links between the statistics of a corpus that describes a particular domain and individuals' physiological reactions to the text based on their level of expertise in the domain. Such a link could find its way into technology that solves practical, real-world problems.

There are multiple components to the underlying statistics of the text. Term frequency in a particular domain, term frequency in the language as a whole, term distribution, term context, and term associations are some of the key ones. We used the STANLEY library to break up the original text along these dimensions. For this invention, we focused specifically on term "entropy"—the distribution of terms across a corpus of documents.

Understanding the relationship between the statistics of text in a domain and where people find surprising information has the potential to impact multiple aspects of information technology development. First, we can develop algorithms for modeling individuals by watching their eye movements while reading. For example, if a person is reading a web page, it may be possible to detect what terms in that web page are familiar to a person and what terms are not. This could help an automated assistant look up information in the background for the user, in the case of web browsing. In the case of education, it could help identify what parts of the material the person is not learning adequately so the curriculum could be adjusted accordingly.

Second, these findings suggest algorithms that we could use to model people based on the statistics of the text. If we understand the statistical properties that identify terms that are key terms for someone who has studied the text or we know about the conditions under which people learn relationships between concepts, we can estimate what a person would learn if they studied a particular textbook.

Third, these finding suggest that in some fashion, people encode and remember at least some statistical properties of the texts in their domain of expertise. However, it is highly unlikely that they do it in the same manner as information retrieval algorithms. This suggests that it would be useful to develop alternative algorithms that can accomplish responsiveness to the statistics of a corpus that do not collect comprehensive statistics.

Fourth, this work may suggest better test sets for evaluating information retrieval systems. Some test sets, like question answering problems, are composed of simple questions with simple answers. But if we could gain a deep enough insight into how the statistics map to a user's knowledge acquisition, more sophisticated information discovery tests could be developed.

A predominant approach to analyzing text (and the one adopted for the work discussed here) is called the "bag of words" approach. The "bag of words" approach treats each document as an unordered set of words, taking into account only the number of times that each term occurs in each document. Given an entire corpus, a number of different measures can be taken for the term, such as the total number of times the term occurs across all documents, and the number of documents in which the term occurs.

In the bag of words approach, a very similar thing occurs. The structure of sentences and the meanings of the terms are largely ignored. Instead, it is measurements of the occurrence or absence of terms that are taken into account and information about the meaning of the document is inferred from those statistics.

In preparing an individual document for analysis (existing in a larger corpus), values are assigned to each unique term in each document in order to determine how well that term describes the semantic content of the document. That value is generally the product of two components, the "local weight" and the "global weight."

The word "term" is broadly defined herein to include: individual words, acronyms, multi-word terms (several words commonly used together), phrases, and partial words (e.g., obtained by word stemming). Acronym and abbreviation expansion, spelling normalization, and thesaurus-bases substitutions can be performed to generate a term (also called a 'token' or 'tokenized word-form'). The process of building a collection of terms can be viewed as applying a series of filters from raw text to the finished (processed) collection of 'terms' (where 'term' here refers to the tokenized word-forms). These filters can add multi-word concepts to the collection (filter-in), or they can remove stop-words (such as 'and', 'the', etc.) from the collection (filter-out). In fact, we can think of the filters as a mapping (mathematically speaking) from the raw text or from one collection to another collection, where the mapping can add, remove or even morph the objects in the collection, producing the filtered (processed) collection as output.

Local Weight

The "local weight" is a measure, for an individual document, of how important that term is in that document and corresponds to how well that term might describe the contents of the document. In other words, the local weight is a measure of how well a term describes the document in which it occurs. Local weight measures are oftentimes associated with the number of times the term occurs in that individual document, on the assumption that a term that occurs frequently is likely to be a term that describes the content of the document. So, for example, in a document about computer networking, the term "computer" and "network" are likely to occur frequently. Among the top most frequently occurring terms in this patent specification, for example, are good keywords that describe the content of this patent specification, including: entropy, weight, corpus, expectation, knowledge, and information. Usually raw term counts are not used directly in the computation of this local weight (although they can be). A number of measures are used; with a logarithmic scale being the most common both to normalize the range of possible values and to help control for document length. The actual equation used for the local weight is:

$$\log(1+f_{ij}) \quad \text{eq. (1)}$$

Where $f_{ij}$ is the number of times the term i occurs in document j.

This approach has a glaring problem in it. While on the one hand, some of the key terms do, in fact, occur frequently, so do many other terms that are not key terms. In fact, by far the most frequent term is "the," which does not convey any information content of the document. This is the same problem that arose with "salience" in a video processing problem. Salient parts of the video did contain some of the key items of interest, but it also contained a lot of things that were not key. The computation of global weight is a way to deal with this problem.

Global Weight

While the local weight for a given term is different for each document (related to the number of times the term occurs in the document), the global weight is the same for a given term across an entire corpus. The global weight is a measure of how well a term describes the corpus in which it occurs.

Classically, a term is considered a good indicator of the content of some document if it occurs infrequently in the corpus as a whole. The measure often used is entropy, although the equation is written such that terms with high entropy are given low values and terms with low entropy are given high values. The global weight $w_i$ of some term i is:

$$w_i = 1 - \left( \frac{-\sum_j (p_{ij} \log(p_{ij}))}{\log(n)} \right) \quad \text{eq. (2)}$$

where $$p_{ij} \text{ is } \frac{f_{ij}}{g_i}$$

$f_{ij}$ is the number of times the term i occurs in a given document I.

$g_i$ is the total number of times the term occurs in the entire corpus.

n is the number of documents in the corpus.

The terms that only occur once get the highest entropy weighting. Because most terms only occur once (including things like misspellings), it is not the case the terms with high global weights make the best indexing terms. It is not the case that infrequently occurring terms always make better keywords.

Figure 1:
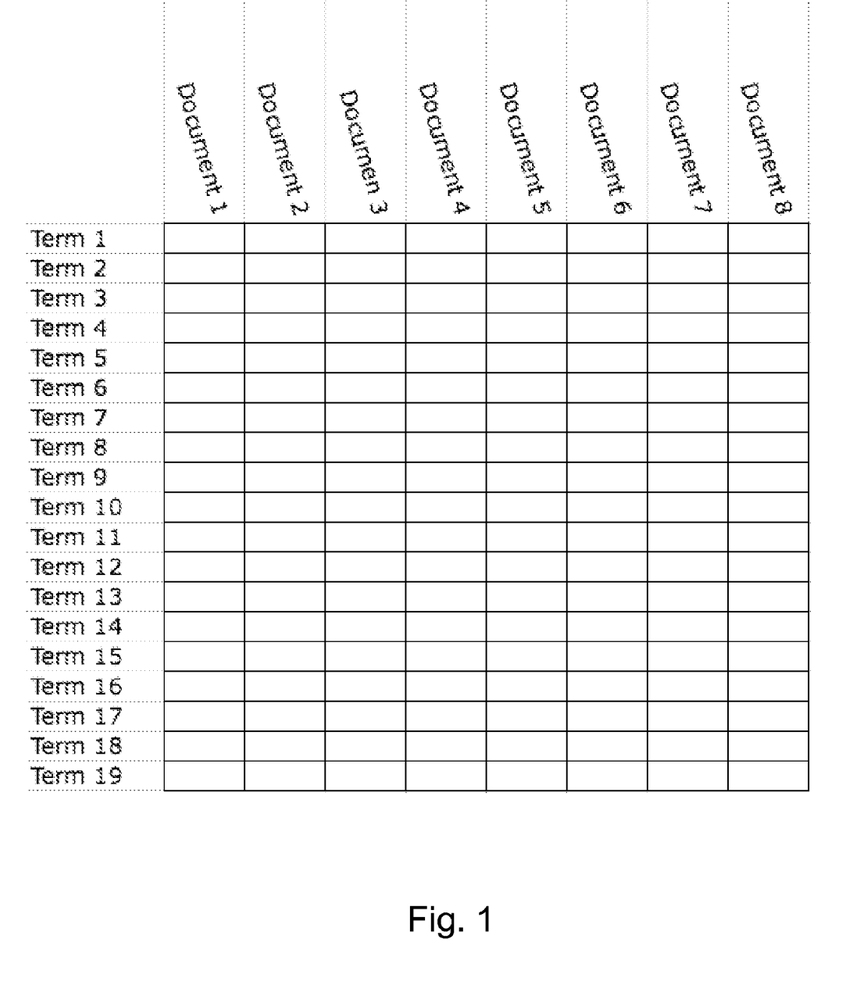
FIG. 1 shows a representation of a document/term matrix.

A value is assigned to each unique term in each document as a product of the local and global weight of that term. The result can be treated as a vector representation of the document, with each unique term constituting a different dimension in the feature space. This vector is a much better representation of the semantic content of the document than either local or global weights alone. Typically this type of vector is calculated for multiple documents (usually all the documents in the corpus of interest). Each document vector constitutes a column in a matrix and each row represents a term. Because most terms occur only once, the matrix is a sparse one. FIG. 1 shows a representation of a document/term matrix.

Global weights based on entropy provide a set of expectations regarding how terms tend to occur in a given corpus. And just as violations of those expectations can be measured at various specific parts of a video, violations of expectations in individual sentences can be indicated by the occurrence of otherwise low entropy terms.

Dimensions to Explore in the Text Analysis Work

In text analysis, the smallest unit that we analyze, the term, has more semantic meaning. One of the key advantages that this buys us is comparison of terms not only within a corpus, but also in the English language as a whole. The user of the pixel in the most upper left hand corner of a video means very different things from video to video. But in language, a specific term can have a relatively narrow meaning. There are thus a couple of different measurements at our disposal:

Term frequency and distribution in the language as a whole.

Term frequency and distribution in the area of a person's expertise.

Terms occurring in or out of context with each other.

Terms that occur when a person is focused on a particular phase of their work.

Prevalence of a Term in the Entire English Language

Studies have been done of large representative samples of English language to determine how often terms occur. Given that a person is proficient in English, they should have received exposure to particular terms with some predictable frequency. So regardless of whether a person is an expert or a novice in a particular field, we can expect them to be familiar with various high frequency terms.

Prevalence of a Term in a Person's Area of Expertise

Different people have different areas of expertise with unique exposure to unusual terminology. In fact, domain expertise involves a variance or specialization of term frequencies and co-occurrences compared with how terms are used in English in general. If we know what documents a person has accessed or produced, we might be able to model the additional terms with which they might be familiar.

In the classical entropy based "equations above (Eqs. 1 and 2), we give a high weight to terms that occur infrequently. The classical formulation of entropy in Eq. (2) contains a difference between the entropy $H_A(i)$ of term i in document set A and the maximum entropy for a set of documents of size n, divided by the maximum entropy for a set of documents of size n, where $H_A(i)$ is given by equation 3:

$$H_A(i) = -\sum_j p_{ij} \log(p_{ij}) \quad \text{Eq. (3)}$$

These classical dominance values will take on values between 0 and 1, inclusive. One difficulty of this classical dominance metric is that, for example, when a term has the same percentage spread in each of two different sized document sets, the dominance values could be different for each of these sets. The dominance values of the case just described would seem to merit the same value, and yet, because of the denominator in Eq. (2), there is a dependence upon the logarithm of n.

However, according to the present invention, in order to generate a list of terms with which the person might be familiar due to their level of expertise, we want to do the opposite, i.e. give a high weight to terms that occur frequently, and that are spread out across the documents that the person has accessed or produced. Also, we might want to compare those lists to the lists of other people.

In the present invention, we often want to compare the global weights from one corpus to another. One can't do this with Eq. 2 because it is not normalized for the size of the corpus. For information retrieval purposes, the classical approach is fine because a global weight is only used within the context of the specific corpus for which it was computed and, hence, the comparison of global weights for different terms within a single corpus is valid.

The present invention comprises an improved set of normalized entropy equations (which we will define as the "dominance" metric). The dominance of a term in a set of text documents (corpus) refers to a metric describing the representational power of the term to characterize documents in the set. A term that always occurs evenly in each document of the set does not act to characterize any specific document in the set. Conversely, a term that only occurs in a single document precisely identifies that document in keyword searches.

The dominance values will be nearly identical for document distributions where the spread is proportional, for a single term (i.e., if term i appears equally in half of the documents in two separate distributions, with different values for n their dominance values will be the same). Normalized for the size of the corpus, and giving high value to terms with high entropy, the improved entropy equation used in the present invention is shown in Eq. 4

$$D_A(i) = \frac{2^{H_A(i)}}{n} \quad \text{Eq. (4)}$$

In other words, Eq. (4) is the "dominance" equation that normalizes entropy for different corpora sizes (i.e., the number of documents, n, in a given corpus of documents). To develop this improved computation of term dominance, we removed the denominator factor from Eq. (2) and, instead, we raised to the power 2 to get out of the logarithm space (or dimension); and, finally, we divided this quantity into 1 to achieve normalized values between 0 and 1 (actually, between $1/N_A$ and 1). Since the entropy calculation takes on values between 0 and log(n), then our improved dominance formula, Eq. (4), will show what fraction of the document set (n) is covered (i.e., spread) by a particular term's distribution ($p_i$'s). Using Eq. (4) we get out of logarithmic space, and we divide by the size of the corpus, n, to normalize it for different corpus sizes.

Currently, this improved dominance metric is being employed in the STANLEY library to measure term dominance within document sets, as well as to help characterize automatically discovered topics (contexts).

Terms Occurring in or Out of Context with Each Other

Within a given domain, some terms will tend to co-occur in certain contexts. For example, in a corpus of documents about the history of the United States, we would expect the term "government" to be closely associated with terms like "congress", "constitution" and "congress". For a person who has expertise in that area, we would expect them to have built up background knowledge such that they have an expectation that those terms would occur together. When that expectation is violated, we would expect them to be surprised (by definition).

Figure 2:
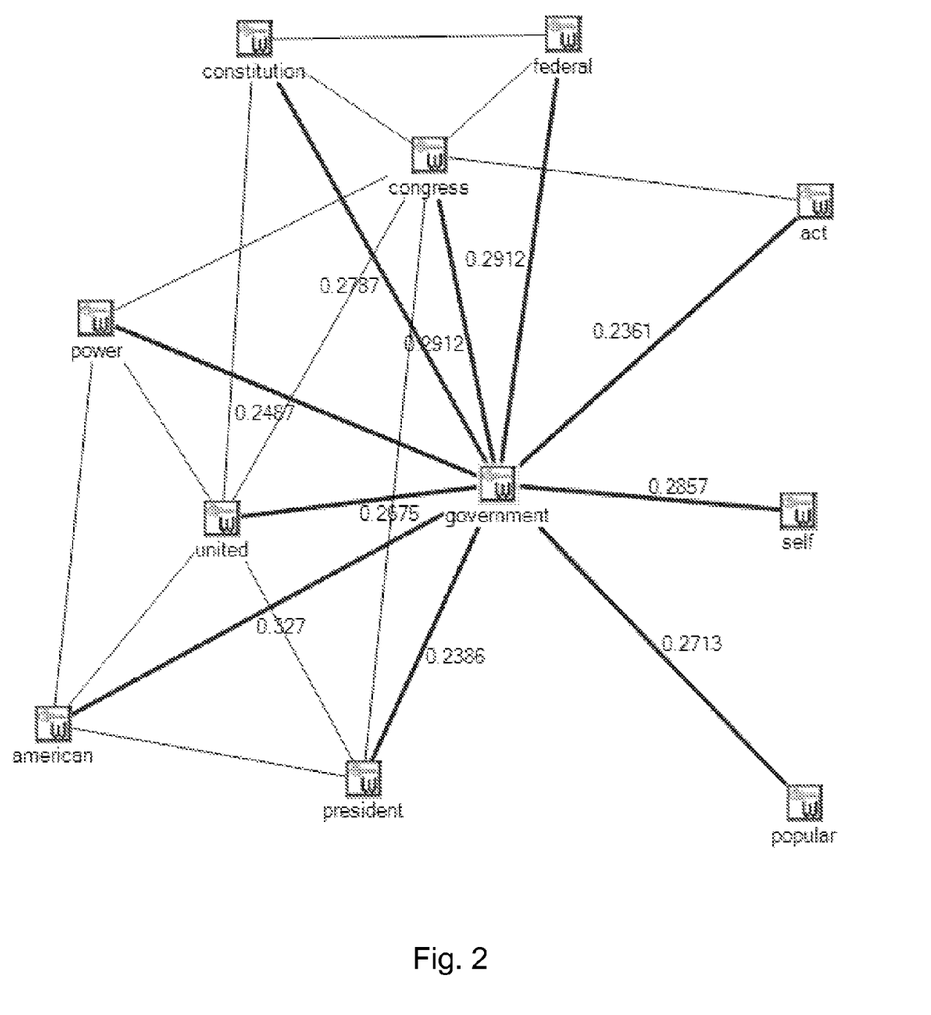
FIG. 2 shows an example of the term "government" plotted along with the terms that have the closest association as computed by the above description.

Co-occurrence can be calculated from the document term matrix described in FIG. 1. Each row constitutes a description of the documents in which a term occurs and can thus be thought of as a feature vector for that particular term. The "association" of two terms can be computed as the cosine between those vectors. Terms whose vectors have a high cosine similarity will tend to co-occur most often with each other. Terms whose vectors have a low cosine similarity will tend to occur more often without each other. As an illustration, we did an analysis of the "History of the United States," published in 1921 by Charles and Mary Beard. FIG. 2 shows an example of the term "government" plotted along with the terms that have the closest association as computed by the above description. As can be seen, the term "government" is closely associated with other terms semantically related to the domain of US history.

Figure 3:
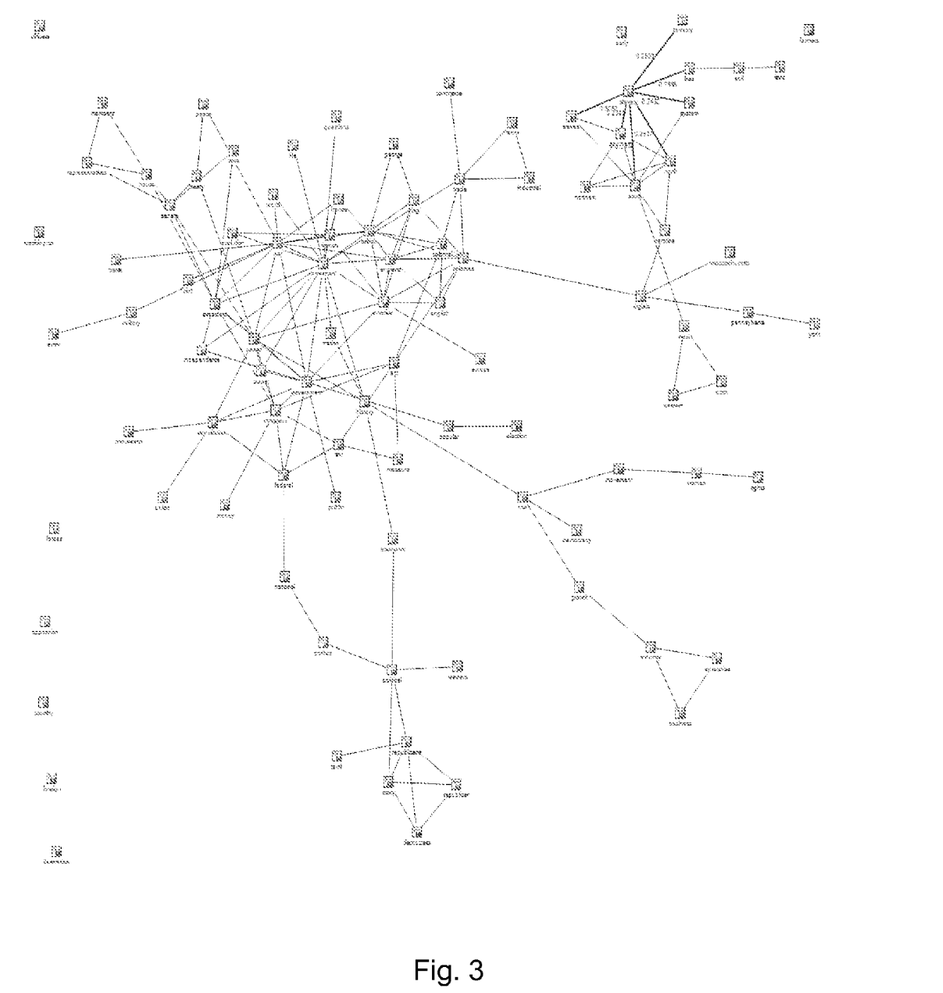
FIG. 3 shows an example of a map of relationships for many of the top 150 most dominant terms in "History of the United States."

These relationships are complex and overlapping, but examined as a whole, can show different contexts that exist for an individual who is an expert in a particular domain. FIG. 3 shows an example of a map of relationships for many of the top 150 most dominant terms in "History of the United States." The image is too small to see the individual terms, but the mapping of the associations among terms generates clusters that constitute topical contexts such as slavery, women's rights, and political parties.

In a similar fashion, the "association" between two or more people can be computed as the cosine between the vectors of pairs of people who have generated or accessed the corpus, having extracted the terms that have a high entropy for characterizing each individual.

Terms that Occur when a Person is Focused on a Particular Phase of their Work

A person may focus on a different aspect of their expertise at different times. These aspects form a multidimensional space within which a person may respond with surprise, as depicted in FIG. 4.

Figure 4:
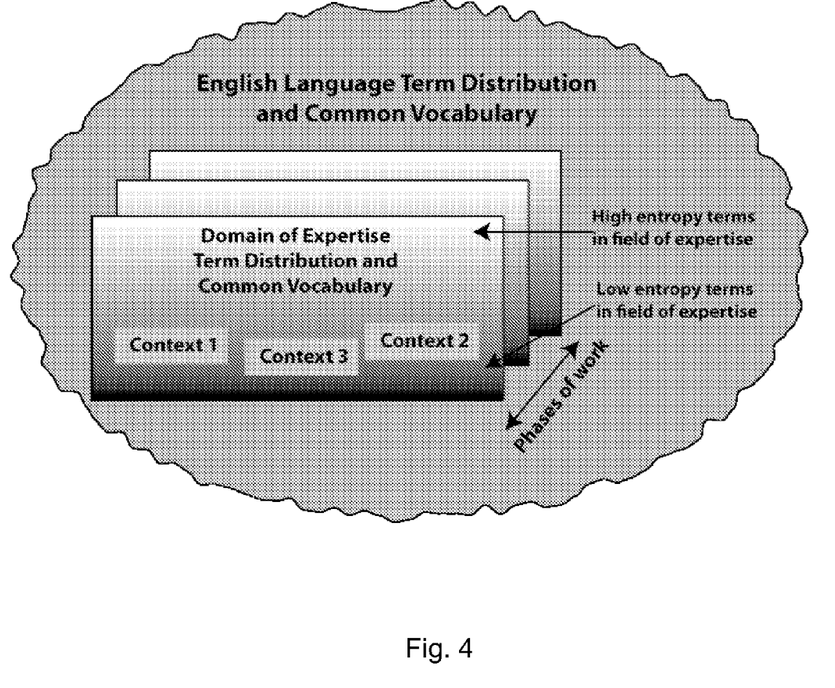
FIG. 4 summarizes the dimensions of the space in which we might be able to measure expectations and violations of those expectations in text.

FIG. 4 summarizes the dimensions of the space in which we might be able to measure expectations and violations of those expectations in text.

Process Steps

Figure 5:
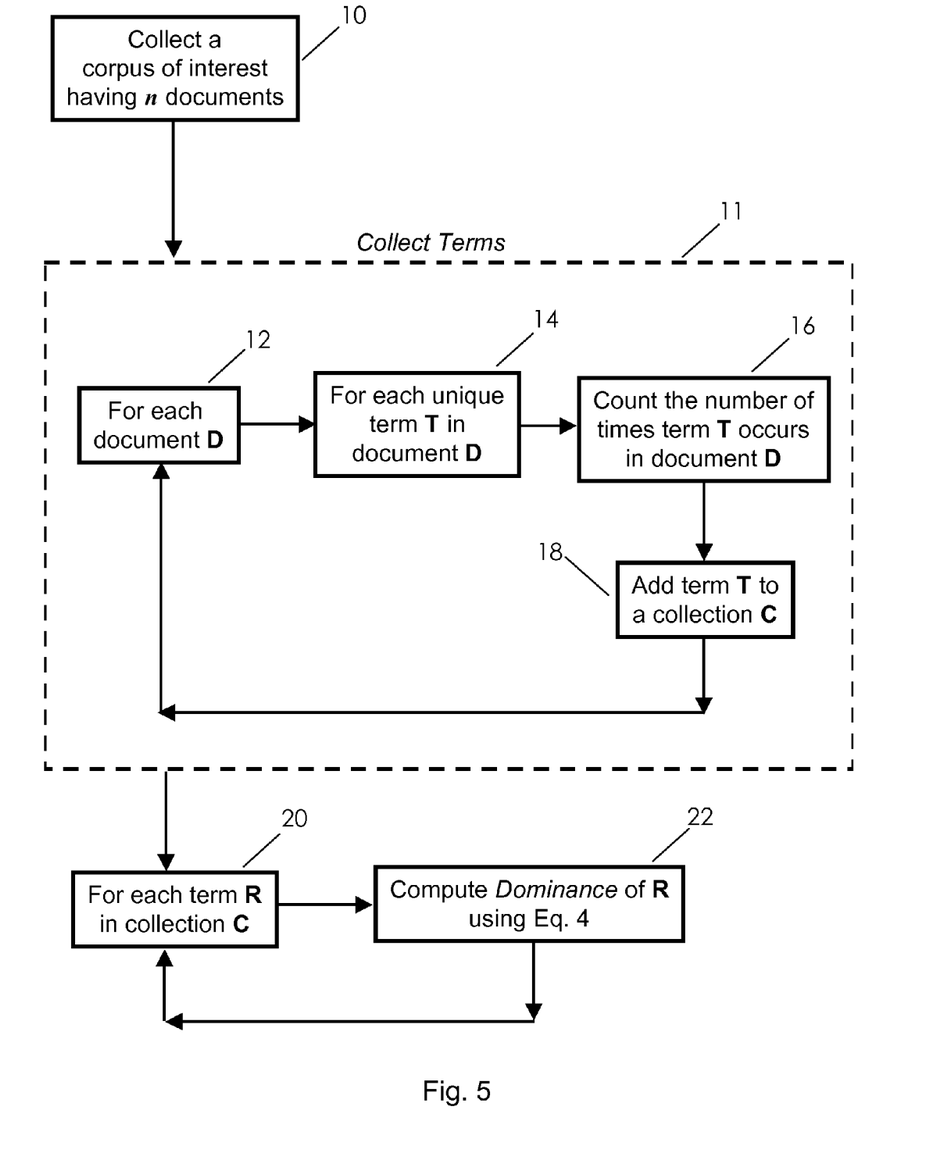
FIG. 5 shows a flow chart depicting one example of the method of the present invention.

FIG. 5 shows a flow chart depicting an example of a process of the present invention. Step 10 comprises collecting a corpus of interest, A, where the corpus has n documents. Then, in step 11, the terms are collected. Step 11 (collecting terms) is broken down into steps 12, 14, 16 and 18; which are performed repeatedly for each unique term T in Document D, for each document D in the entire corpus of interest. Step 12 comprises selecting a document D. Step 14 comprises selecting each unique term T in the document D. Step 16 comprises counting the number of times term T occurs in document D. Step 18 comprises adding the term T to a collection C. Once all of the terms from the corpus have been collected, then step 11 is complete. Next, step 20 comprises selecting each term R in collection C, followed by computing (in step 22) the Dominance, $D_A(i)$, of R using Eq. (4). Steps 20 and 22 are repeated for each term R in collection C, eventually generating a set of dominance values comprising each dominance metric calculated for each term R in collection C. The method can further comprise storing the corpus within a computer accessible database; and displaying the set of dominance values to a display screen.

Figure 6:
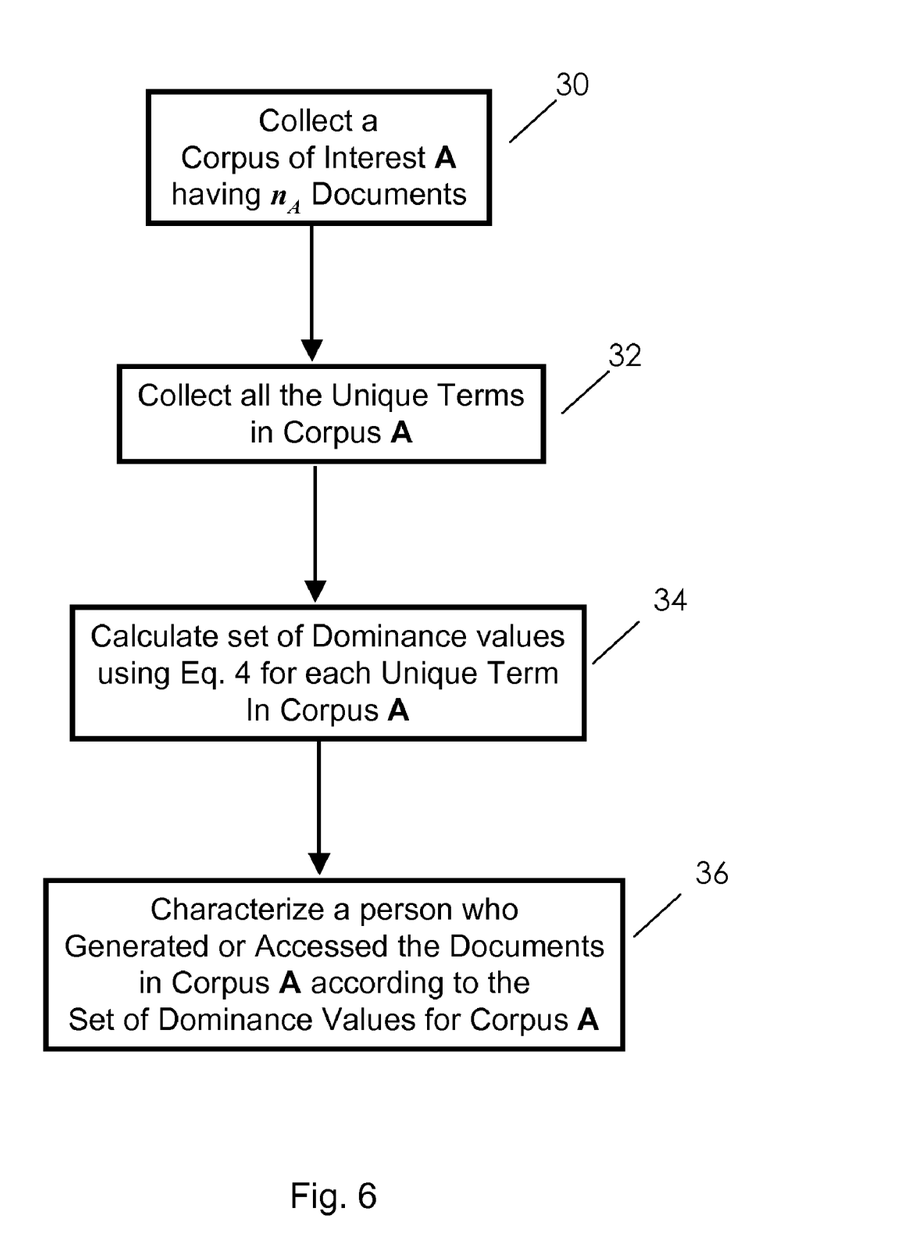
FIG. 6 shows a flow chart depicting another example of the method of the present invention.

FIG. 6 shows a flow chart depicting another example of a process of the present invention. Step 30 comprises collecting a corpus of interest, A, where the corpus has $n_A$ documents. Step 32 comprises collecting all the unique terms in the corpus (note: step 32 comprises all of the steps inside of the dashed-line box (step 11) in FIG. 5). Step 34 comprises calculating a set of dominance values using Eq. 4 for each unique term in Corpus A. Step 36 comprises characterizing a person who generated or accessed the documents in corpus A, according to the set of dominance values for Corpus A. Step 36 can include sorting the set of dominance value from greatest to least; identifying a sub-set of terms having large dominance values; and then characterizing the corpus (or the person who generated or accessed the corpus) according to that sub-set of terms having large dominance values. The method can further comprise storing the corpus within a computer accessible database; and displaying the results of the characterizing step to a display screen.

Figure 7:
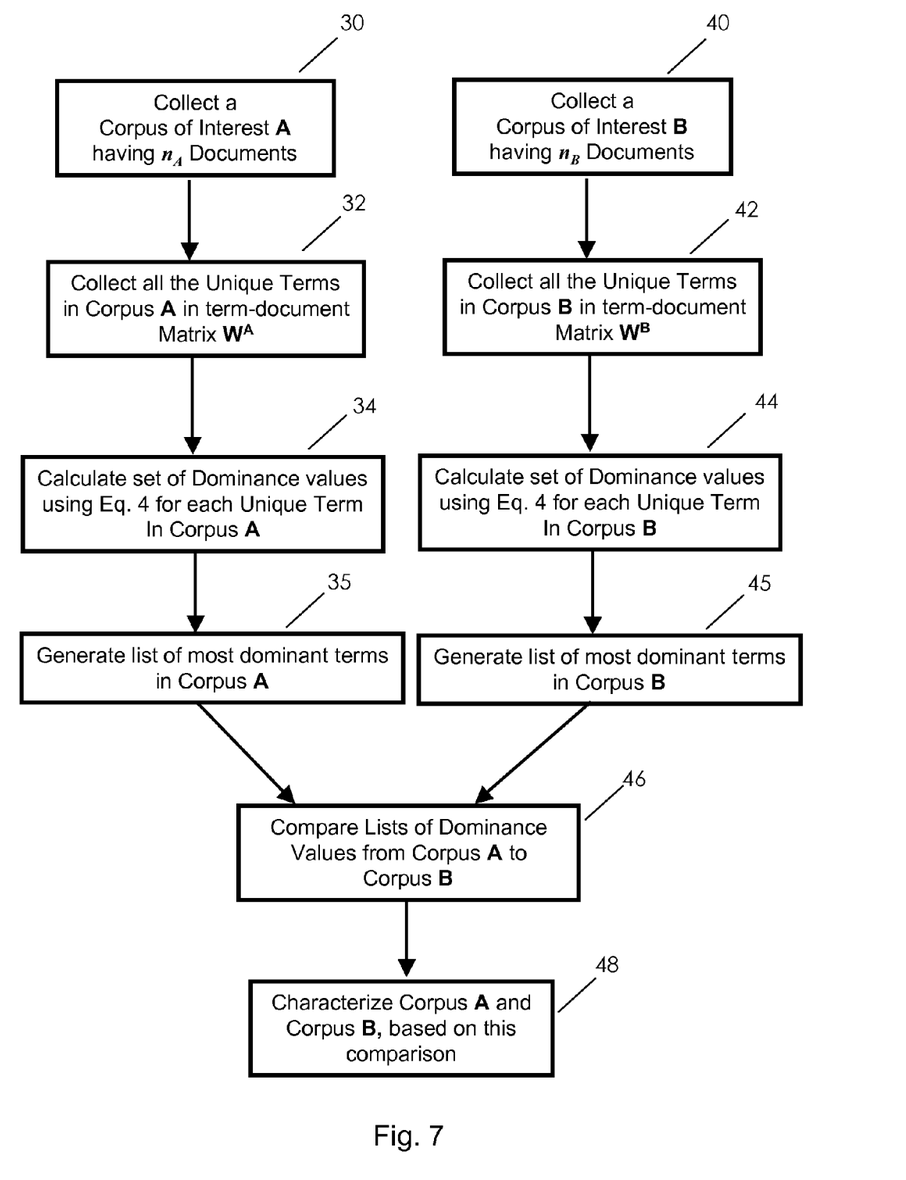
FIG. 7 shows a flow chart depicting another example of the method of the present invention.

FIG. 7 shows a flow chart depicting another example of a process of the present invention. Step 30 comprises collecting a first corpus of interest, A, where the corpus has $n_A$ documents. Step 32 comprises collecting all the unique terms in the first corpus (note: step 32 comprises all of the steps inside of the dashed-line box (step 11) in FIG. 5). Step 34 comprises calculating a set of dominance values using Eq. 4 for each unique term in Corpus A. In a parallel path, step 40 comprises collecting a second corpus of interest, B, where the second corpus has $n_B$ documents. Step 42 comprises collecting all the unique terms in the second corpus (note: step 42 comprises all of the steps inside of the dashed-line box (step 11) in FIG. 5). Step 44 comprises calculating a set of dominance values using Eq. 4 for each unique term in Corpus B. Step 46 comprises comparing (e.g., computing a similarity or difference measure between) the dominance values calculated for Corpus A to the dominance values calculated for Corpus B for each unique term. Step 46 can be performed for each unique term that is in common to both corpus A and B. Or, alternatively, it can be performed only for terms that only occur in one or the other corpus. Finally, step 48 comprises characterizing Corpus A and Corpus B, based on the results of the previous comparison step. The method can further comprise storing both corpus A and B within a computer accessible database; and displaying the results of the comparison and characterization step to a display screen.

There are several ways (mathematical functions) that can be used to characterize the similarity (or difference) between models of people (through their associated accessed corpora). One way is to assume that terms that are not common to both models do not add to the similarity comparison. However, we could use the amount of terms that are not common across both models as a measure of dissimilarity between models. Our current, most widely used, model-to-model comparison uses only those terms that are common to both models to compute a similarity measure (i.e., a scalar number) between the models.

Mathematically, what we are saying is that a term that does not occur in a model carries 0 weight in the model, thus adds 0 to any (additive) comparison with that model. The most current algorithm has the following steps:
(1) find the most dominant terms in model A and model B (this involves steps already characterized in FIGS. 5 and 6 (or equivalently as part of steps 30-34 and 40-44 in FIG. 7). Note that "Model A" refers to the output from step 34 in FIG. 7, and "Model B" refers to the output from step 44 in FIG. 7;
(2) create a collection of most dominant terms from models A and B (this step involves creating a collection that is the intersection of the collections created in step 1). In this case, we can specify the number of most dominant terms we want to use, such as N=50, where we will use the 50 most dominant terms from both A and B. At this point we have a collection of N terms;
(3) for each pair of terms from the collection created in step 2, compute the term-by-term similarity from model A and from model B, independently. At the end of this step we will have constructed two equally sized vectors of paired term-by-term similarities, one each for model A and model B; and
(4) compute the final similarity measure (scalar) between model A and Model B as a cosine similarity of the vectors constructed in step 3.

A more detailed version of this algorithm is presented next.

Model-to-Model Comparison Algorithm (Steps 46 and 48)

The process shown in Steps 30 through 32 and Steps 40 through 42 of FIG. 7 produces two separate term-document matrices of the type shown in FIG. 1. One matrix, $W^A$, will correspond to the result of processing the corpus of interest, A, in Steps 30 through 32; and the other matrix, $W^B$, will correspond to the result of processing the corpus of interest, B, in Steps 40 through 42, as shown in FIG. 7.

Next, the result of Steps 34 and 44 shown in FIG. 7, consists of two lists of the most dominant terms: one for the first corpus of interest, A, and the other for the second corpus of interest, B. By the definition of dominance (equation (4)), these two lists also correspond to the most significant (or dominant) rows in $W^A$ and $W^B$, respectively.

Next, for any two terms either in the first corpus of interest, A, (or in the second corpus of interest, B) we can compute a term-to-term similarity measure using the rows of $W^A$ or $W^B$. Thus, the term-similarity, $s_{ij}^A$, for terms i and j in the corpus of interest, A, is computed as $$s_{ij}^A = \cos\theta_{ij}^A = \frac{W_i^A \cdot W_j^A}{\|W_i^A\|\|W_j^A\|} = \frac{\sum_{k=1}^{|D^A|} W_{ik}^A W_{jk}^A}{\sqrt{\sum_{k=1}^{|D^A|} W_{ik}^A W_{ik}^A} \sqrt{\sum_{k=1}^{|D^A|} W_{jk}^A W_{jk}^A}} \quad \text{Eq. (5)}$$

where $\theta_{ij}^A$ is the angle between the term vectors, $W_i^A$ and $W_j^A$, corresponding to terms i and j respectively, and $|D^A|$ is the number of documents in the corpus of interest, A. Note that a similar equation holds for the second corpus of interest, B, where A is replaced by B.

Next, in Step 46, shown in FIG. 7, we find the intersection, $DT^{AB}$, of the most dominant terms from the corpus of interest, A, and the corpus of interest, B. From this intersection, we choose the top N (e.g., N=50) most dominant terms from both A and B. Note that all terms in this intersection exist in both corpora (A and B). In order to compute the model-to-model similarity shown in Step 48 of FIG. 7, we next compute a separate paired-term dominance vector for both corpora (A and B) using our intersection of most dominant terms from step 46. The paired-term dominance vectors for both A and B, $M^A$ and $M^B$, are computed using all possible non-reflexive pairs of terms from $DT^{AB}$ $$M^A = \{M_{ij}^A = s_{ij}^A, \forall i \neq j, i,j \in DT^{AB}\} \quad \text{Eq. (6)}$$

where $s_{ij}^A$ is defined in Eq. (5). Note that a similar equation holds for the corpus of interest, B, where A is replaced by B.

Finally, a model-to-model comparison of A and B, shown as Step 48 in FIG. 7, can be computed by using the cosine similarity between vectors $M^A$ and $M^B$ $$s^{AB} = \cos\theta^{AB} = \frac{M^A \cdot M^B}{\|M^A\|\|M^B\|} = \frac{\sum_{k=1}^{|DT^{AB}|} M_k^A M_k^B}{\sqrt{\sum_{k=1}^{|DT^{AB}|} M_k^A M_k^A} \sqrt{\sum_{k=1}^{|DT^{AB}|} M_k^B M_k^B}} \quad \text{Eq. (7)}$$

where $\theta^{AB}$ is defined as the angle between the dominance models for the two corpora of interest (A and B); $M^A$ and $M^B$ are defined in Eq. (6); and $|DT^{AB}|$ is the number of all possible non-reflexive pairs of dominant terms from the intersections of the two corpora (A and B). Thus, $s^{AB}$, defined in Eq. (7), is the model-to-model similarity between A and B, and is a scalar number between 0 and 1 representing the degree of similarity between models of corpus A and corpus B.

The process described in FIG. 7 (i.e., comparing across two different corpora, A and B), can be logically extended to comparing across any number of different corpora, A, B, C, D, etc.); for example, by comparing pairs of corpora (e.g., A and B, then C and D, etc.) and then comparing the results of those first level pair comparisons, in a binary tree fashion. Other methods can be used, as well.

The processes of the instant invention can be performed on text documents written in English, or any other language.

The present invention has used dominance to compare document groups in one language to document groups in another language (through a cross-language comparison interface). With the present dominance algorithm, we are comparing two (or even more than two) document sets; and in a particular application, each of these could correspond to a person, a group of people (e.g., a news source, or announcements from some official body), or even to an ideology or a culture (i.e., through the text used to describe such an entity).

Figure 8:
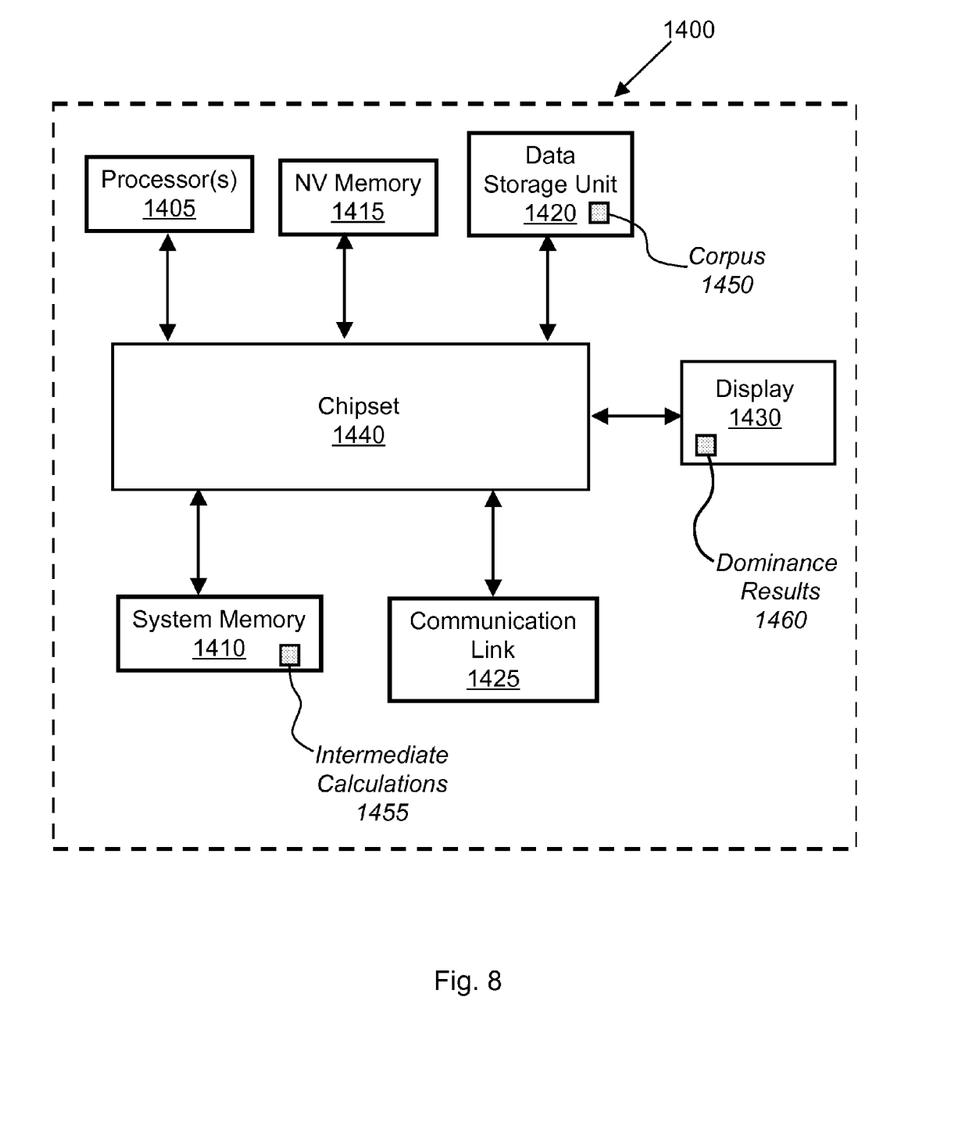
FIG. 8 is a schematic block diagram illustrating a demonstrative processing system for executing embodiments of the invention described above.

FIG. 8 is a schematic block diagram illustrating a demonstrative processing system 1400 for executing embodiments of the invention described above. The illustrated embodiment of processing system 1400 includes one or more processors (or central processing units) 1405, system memory 1410, nonvolatile ("NV") memory 1415, a data storage unit ("DSU") 1420, a communication link 1425, a display 1430, and a chipset 1440. The illustrated processing system 1400 may represent any computing system including a desktop computer, a notebook computer, a workstation, a handheld computer, a server, a blade, or the like. As illustrated, corpus 1450 may be stored in DSU 1420 while the intermediate calculations 1455 may be stored in system memory 1410 during runtime, and dominance results 1460 rendered to display 1430 for review by a user.

The elements of processing system 1400 are interconnected as follows. Processor(s) 1405 is communicatively coupled to system memory 1410, NV memory 1415, DSU 1420, and communication link 1425, via chipset 1440 to send and to receive instructions or data thereto/therefrom. In one embodiment, NV memory 1415 is a flash memory device. In other embodiments, NV memory 1415 includes any one of read only memory ("ROM"), programmable ROM, erasable programmable ROM, electrically erasable programmable ROM, or the like. In one embodiment, system memory 1410 includes random access memory ("RAM"), such as dynamic RAM ("DRAM"), synchronous DRAM ("SDRAM"), double data rate SDRAM ("DDR SDRAM"), static RAM ("SRAM"), or the like. DSU 1420 represents any storage device for software data, applications, and/or operating systems, but will most typically be a nonvolatile storage device. DSU 1420 may optionally include one or more of an integrated drive electronic ("IDE") hard disk, an enhanced IDE ("EIDE") hard disk, a redundant array of independent disks ("RAID"), a small computer system interface ("SCSI") hard disk, and the like. Although DSU 1420 is illustrated as internal to processing system 1400, DSU 1420 may be externally coupled to processing system 1400. Communication link 1425 may couple processing system 1400 to a network such that processing system 1400 may communicate over the network with one or more other computers. Communication link 1425 may include a modem, an Ethernet card, a Gigabit Ethernet card, Universal Serial Bus ("USB") port, a wireless network interface card, a fiber optic interface, or the like. Display unit 1430 may be coupled to chipset 1440 via a graphics card and renders images for viewing by a user.

It should be appreciated that various other elements of processing system 1400 may have been excluded from FIG. 6 and this discussion for the purposes of clarity. Chipset 1440 may also include a system bus and various other data buses for interconnecting subcomponents, such as a memory controller hub and an input/output ("I/O") controller hub, as well as, include data buses (e.g., peripheral component interconnect bus) for connecting peripheral devices to chipset 1440. Correspondingly, processing system 1400 may operate without one or more of the elements illustrated. For example, processing system 1400 need not include DSU 1420.

The processes explained above are described in terms of computer software and hardware. The techniques described may constitute computer-executable instructions embodied or stored within a machine-readable storage medium, that when executed by a machine will cause the machine (e.g., computer, processor, etc.) to perform the operations described. Additionally, the processes may be embodied within hardware, such as an application specific integrated circuit ("ASIC") or the like.

A machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The particular examples discussed above are cited to illustrate particular embodiments of the invention. Other applications and embodiments of the apparatus and method of the present invention will become evident to those skilled in the art. It is to be understood that the invention is not limited in its application to the details of construction, materials used, and the arrangements of components set forth in the following description or illustrated in the drawings.

The scope of the invention is defined by the claims appended hereto.

What is claimed is:

1. A computer-implemented method comprising:
generating, with a processor of a hardware computing system, a set of dominance metrics for a first corpus A having n documents, wherein the set of dominance metrics includes for each term i in a collection C a respective dominance metric $D_A(i)$ which is based on a quotient of:
an exponentiation of two by an entropy value for the respective term i; and
the number n of documents in the first corpus A;
wherein the entropy value for the respective term i is based on a respective sum of product values for each document j of first corpus A, wherein each of the product values is based on a respective product of:
a respective value $p_{ij}$; and
a logarithm of the respective value $p_{ij}$;
wherein the respective value $p_{ij}$ is based on a quotient of:
a number of times term i occurs in document j; and
a total number of times term i occurs in first corpus A; and storing information characterizing the first corpus A to a data storage unit communicatively coupled to the processor, the information based on the generated set of dominance metrics.

2. The method of claim 1, further comprising:
sorting the set of dominance metrics; and
based on the sorted set of dominance metrics, identifying a sub-set of terms of the collection C; and
wherein the stored information characterizes the first corpus A based on the identified sub-set of terms.

3. The method of claim 1, further comprising:
using the set of dominance metrics to characterize a person who generated or accessed the first corpus A.

4. The method of claim 1, further comprising:
comparing a second set of dominance values from a second corpus B to the set of dominance values from the first corpus A.

5. The method of claim 1, further comprising:
storing the first corpus A within a computer accessible database; and
displaying the set of dominance values to a display screen.

6. The method of claim 4, further comprising:
storing the first corpus A within a computer accessible database; and
displaying a result of the comparing to a display screen.

7. The method of claim 4, wherein the comparing step comprises:
creating a collection of dominant terms common to both first corpus A and second corpus B;
based on the collection of dominant terms, constructing two vectors of paired term-by-term similarities, one vector each for first corpus A and second corpus B; and
computing a scalar similarity measure between first corpus A and second corpus B including determining a cosine similarity of the two vectors of paired term-by-term similarities.

8. The method of claim 7, further comprising:
calculating a first term-similarity measure for two terms in the first corpus A; and
calculating a second term-similarity measure for the same two terms in the second.

9. The method of claim 8, further comprising:
finding an intersection of the most dominant terms from first corpus A and second corpus B; and
selecting the top N most dominant terms from both first corpus A and second corpus B.

10. The method of claim 9, wherein N is less than or equal to 50.

11. The method of claim 9, further comprising:
based on the intersection, calculating a first paired-term dominance vector, $M^A$, for first corpus A;
wherein the first paired-term dominance vector, $M^A$, is computed using all possible non-reflexive pairs of terms from intersection; and
based on the intersection, calculating a second paired-term dominance vector, $M^B$, for second corpus B.

12. The method of claim 11, further comprising generating a model-to-model comparison of first corpus A to second corpus B, including computing a cosine similarity, $s^{AB}$, between vector $M^A$ for first corpus A, and vector $M^B$ for second corpus B.

13. The method of claim 1, further comprising using the set of dominance metrics to characterize a group of people who have generated or accessed the first corpus A.

14. The method of claim 1, further comprising using the set of dominance metrics to characterize a news source or official body that has generated or accessed the first corpus A.

15. An article of manufacture comprising a computer readable storage medium having instructions stored thereon which, when executed by one or more processors, cause the one or more processors to perform a method comprising:
generating a set of dominance metrics for a first corpus A having n documents, wherein the set of dominance metrics includes for each term i in a collection C a respective dominance metric $D_A(i)$ which is based on a quotient of:
an exponentiation of two by an entropy value for the respective term i; and
the number n of documents in the first corpus A;
wherein the entropy value for the respective term i is based on a respective sum of product values for each document j of first corpus A, wherein each of the product values is based on a respective product of:
a respective value $p_{ij}$; and
a logarithm of the respective value $p_{ij}$;
wherein the respective value $p_{ij}$ is based on a quotient of
a number of times term i occurs in document j; and
a total number of times term i occurs in first corpus A; and
storing information characterizing the first corpus A, the information based on the generated set of dominance metrics.

16. The article of manufacture of claim 15, wherein the method steps further comprise:
sorting the set of dominance metrics; and
based on the sorted set of dominance metrics, identifying a sub-set of terms of the collection C; and
wherein the stored information characterizes the first corpus A based on the identified sub-set of terms.

17. The article of manufacture of claim 15, wherein the method steps further comprise:
using the set of dominance metrics to characterize a person who generated or accessed the first corpus A.

18. The article of manufacture of claim 15, wherein the method steps further comprise:
comparing a second set of dominance values from a second corpus B to the set of dominance values from the first corpus A.

19. The article of manufacture of claim 15, wherein the method steps further comprise:
storing the first corpus A within a computer accessible database; and
displaying the set of dominance values to a display screen.

20. The article of manufacture of claim 18, wherein the method steps further comprise:
storing the first corpus A within a computer accessible database; and
displaying a result of the comparing to a display screen.

21. The article of manufacture of claim 18, wherein the comparing step further comprises:
creating a collection of dominant terms common to both first corpus A and second corpus B;
based on the collection of dominant terms, constructing two vectors of paired term-by-term similarities, one vector each for first corpus A and second corpus B; and
computing a final similarity measure between first corpus A and second corpus B including determining a cosine similarity of the two vectors of paired term-by-term similarities.

22. The method of claim 15, further comprising using the set of dominance metrics to characterize a group of people who have generated or accessed the first corpus A.

23. The method of claim 15, further comprising using the set of dominance metrics to characterize a news source or official body that has generated or accessed the first corpus A.

* * * * *